Oct. 22, 1940. J. FICHTER 2,219,180
GAUGE
Filed Sept. 7, 1939
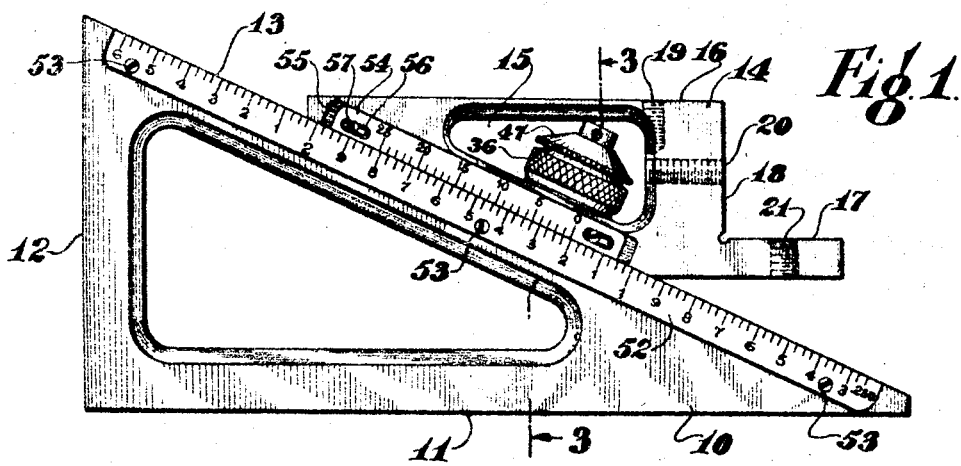
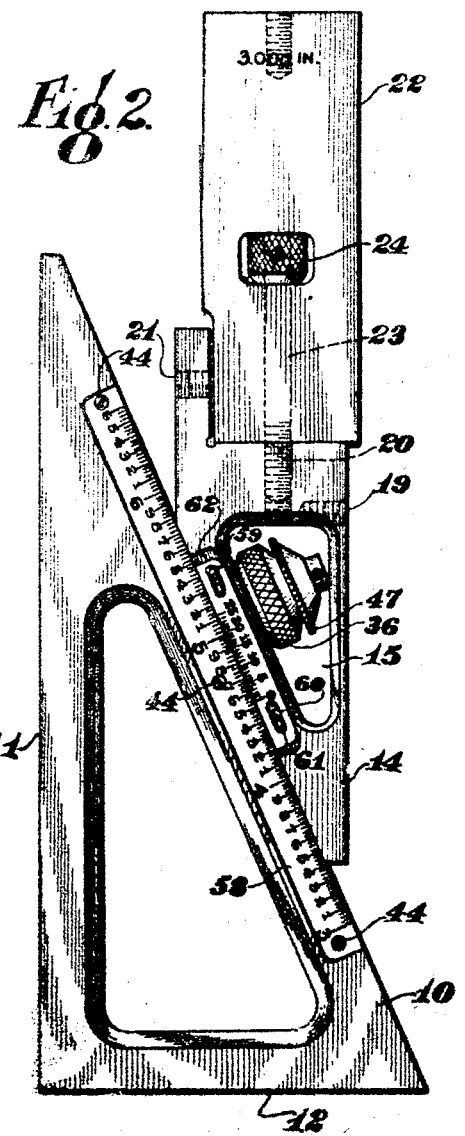
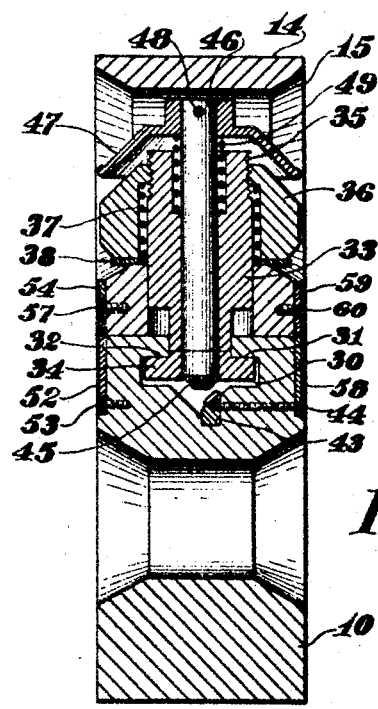
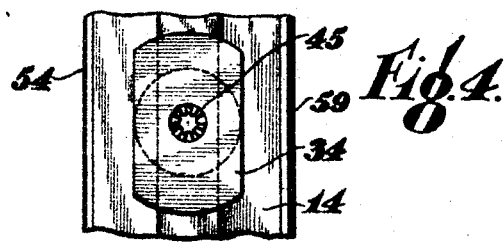
INVENTOR.
*Julius Fichter*
BY *Hroeblingand Kroet*
ATTORNEY.

Patented Oct. 22, 1940

2,219,180

UNITED STATES PATENT OFFICE 2,219,180

GAUGE

Julius Fichter, Cleveland, Ohio

Application September 7, 1939, Serial No. 293,795

13 Claims. (Cl. 33—162)

My invention relates in general to gauges and more particularly to what are generally referred to in the trade as planer and shaper gauges.

An object of my invention is the provision of a vernier incorporated in a planer and shaper gauge in order to obviate the setting of the gauge to a micrometer, a surface gauge, or a caliper, or other measuring device.

Another object of my invention is the provision of a vernier provided upon both sides of the gauge, so that accurate dimensions may be given from one-quarter inch to six inches, when the gauge is used without an extension, and from one-quarter to nine inches when the gauge is used with a three-inch extension.

Another object of my invention is the provision of manually adjusting means for setting the gauge to a vernier reading.

Another object of my invention is the provision of releasably clamping the slidable gauge block with reference to the inclined slideway upon the triangular base.

Another object of my invention is the provision of incorporating a vernier in the gauge, so that all the mechanism is incorporated within the limits of the gauge.

Another object of my invention is the provision of incorporating a vernier in the gauge, so that both of the sides of the right triangular base may be used for gauging faces.

Another object of my invention is the provision of slightly resisting the movement of the gauge block upon the incline slideway of the triangular base to keep the gauge block from sliding while being adjusted.

Another object of my invention is to permit freedom of movement of the gauge block along the inclined slideway without interference to the manual adjusting means employed to produce vernier adjustment movement.

Other objects and a fuller understanding of my invention may be had by referring to the following description and claims, taken in conjunction with the accompanying drawing, in which:

Figure 1 is a side elevational view of a gauge embodying the features of my invention;

Figure 2 is a side elevational view of my gauge, from the opposite side, showing also the adaptation of an extension;

Figure 3 is an enlarged cross-sectional view taken along the line 3—3 of Figure 1; and Figure 4 is a fragmentary, enlarged view looking underneath the gauge block when it is removed from the triangular base.

With reference to the drawing, my invention comprises generally a right triangular base member 10 having gauging faces 11 and 12 on its two sides and a slideway having a longitudinal recess 30 with internal shoulders 31 and 32 on its hypotenuse 13, and a slidable gauge block 14 having a transverse opening 15, slidably mounted on the slideway. The triangular base member 10 and the gauge block 14 are made of hardened steel and all measuring surfaces are accurately ground.

As illustrated, the gauge block 14 is provided with a plurality of gauging surfaces 16 and 17 parallel to and spaced at different distances from the gauging face 11 of the base member 10, and with a gauging surface 18 parallel to and spaced at a distance from the gauging face 12 of the base member. The gauging faces 16, 17, and 18 are adapted to receive a three-inch removable extension 22 having a longitudinal extension screw 23 operated by a knurled knob 24 fastened to the upper end thereof and provided with an open space in the extension 22. In order to accommodate the extension 22, the gauging surfaces 16, 17, and 18 are provided with threaded openings 19, 21, and 20, respectively, to receive the threaded extension screw 23. In this manner the removable extension 22 may be selectively mounted on the gauging surfaces. In accordance with the above arrangement my gauge is adapted to give a measurement from one-quarter inch to six inches without the extension 22 and from one-quarter inch to nine inches with the extension 22. By the use of additional extensions my gauge may give measurements of longer distances than nine inches.

With reference to Figure 3, the clamping arrangement for regulating the position of the gauge block 14 with reference to the inclined slideway upon the triangular base member 10 comprises generally a hollow threaded member 33 having a clamping shoe 34 secured to the lower end thereof and having threads 35 provided upon the upper end thereof. The hollow threaded member 33 extends through the gauge block 14 and terminates within the transverse opening 15 thereof. Threadably attached to the upper end of the hollow threaded member 33 is a knurled clamping nut 36 which when turned down forcibly urges the clamping shoe 34 against the internal shoulders 31 and 32 to clamp the gauge block 14 against the inclined slideway of the base 10. The internal diameter of the clamping nut 36 is removed to provide an annular space for a spring 37 having its upper end engaging an internal shoulder of the clamping nut 36 and its lower end engaging a washer 38 interposed between the clamping nut 36 and the gauge block 14. The object of the spring 37 is to resiliently urge the clamping shoe 34 against the internal shoulders 31 and 32 to produce a slight resistance to the longitudinal movements of the gauge block 14 along the inclined slideway to keep the gauge block from slipping while being adjusted. Therefore, when the clamping nut 36 is turned down the gauge block 14 is anchored in position along the inclined slideway of the base 10 but when the clamping nut 36 is loose the gauge block 14 may be slid along the inclined slideway of the base 10 with a slight resistance.

In order to take care of small longitudinal movements to obtain accurate settings, I utilize the combination of a longitudinal rack 43 and a pinion 45. As illustrated in Figure 3, the longitudinal rack 43 may be positioned in the longitudinal recess 30 and fastened to the base 10 by means of lateral screws 44 extending from the side of the base 10. The pinion 45 may be provided on the lower end of a shaft 46 which extends through the hollow opening of the hollow threaded member 33 and which terminates above the clamping nut 36 in the transverse opening 15 of the gauge block 14. The upper end of the shaft 46 is provided with a knurled adjusting nut 47 which is anchored thereto by a small transverse screw 48. The upper end of the hollow threaded member 33 is relieved internally about the shaft 46 to receive a spring 49 which resiliently urges the pinion 45 out of engagement with the rack 43. By the arrangement of this construction, the gauge block 14 may be longitudinally moved along the inclined slideway of the base 10 without any interference to the rack and pinion 43 and 45. Therefore, when making fine longitudinal adjustments, it is only necessary for the operator to depress the adjusting nut 47 until the pinion 45 engages the rack 43, after which small longitudinal movements may be obtained by turning the adjusting nut 47.

As illustrated in Figure 1, a scale 52 is secured to the longitudinal inclined edge of the base 10 by means of transverse screws 53. A vernier 54 is provided along the inclined edge of the gauge block 14 and is arranged to register with the scale 52. The vernier 54 is mounted in a longitudinal depressed recess 55 and is secured therein by means of screws 57 passing through slotted openings 56. The depressed recess 55 is somewhat longer than the vernier 54 so that the vernier may be adjustably positioned therein by the arrangement of the screws 57 and the slotted opening 56. One of the objects for permitting longitudinal adjustment of the vernier 54 is to initially set the vernier with respect to the scale 52. Thus, for example, the vernier 54 is originally set or adjusted, so that when the zero mark coincides with the one-inch mark on the scale 52, the gauging surface 17 is spaced one inch from the gauging face 11 of the triangular block 10. Another reason for permitting longitudinal adjustment of the vernier 54 in the depressed recess 55 is that after the gauge is in use it may become desirable to re-grind the gauging face 11 of the triangular block in which case it would be necessary to readjust the position of the vernier 54 with reference to the scale 52. In the position illustrated in Figure 1, the gauging surface 17 is 1.205 inches above the gauging face 11 of the triangular block 10. When the zero mark on the vernier coincides with the .250 mark on the scale 52, the surface 17 is one-quarter of an inch above the gauging face 11. When the zero mark upon the vernier coincides with the 2 unit mark upon the scale 52, the gauging surface 17 is spaced two inches from the gauging face 11, and the gauging surface 16 is spaced three inches from the gauging space 11. Therefore when the gauge is used as shown in Figure 1, accurate measurement may be obtained from one-quarter of an inch to three inches.

As illustrated in Figure 2, I provide on the opposite side of the triangular block 10 a scale 58 held by means of the screws 34 which also secure the rack 43 in the triangular block 10. A vernier 59 is provided along the inclined surface of the gauge block 14 and is arranged to register with the scale 58. As illustrated, the vernier 59 is mounted in a depressed longitudinal recess 62 and is adjustably held therein by means of screws 60 extending through elongated slots 61. The reason for adjustably mounting the vernier 59 in the depressed longitudinal recess 62 is the same as that described with reference to the vernier 54; that is to say to provide initial adjustment thereof with respect to the scale 58 and to accommodate readjustment thereof in the event that the gauging surface 12 needs to be ground after it is in use. In using the gauge as shown in Figure 2, without the extension 22, accurate measurement may be obtained from three inches to six inches and with the extension accurate measurement may be obtained up to nine inches. With additional extensions, accurate measurements may be obtained to greater distances than nine inches. Because of the difference in the angularity of the hypotenuse with reference to the gauging face 11 and in the angularity of the hypotenuse with respect to the gauging face 12 the unit graduations of the scales 52 and 58 are of different lengths.

In my invention, it is not necessary to use a micrometer, a surface gauge, or a caliper, or other measuring device in setting the gauge. This materially reduces the time taken by the operator in adjusting the depth of the first cut of the planer or shaper, and in addition the operator has the assurance that the first cut will be absolutely correct to avoid damaging the work piece. In addition my gauge reduces to a minimum the cut and try method which is common in shops not having my gauge. Furthermore, the entire arrangement of my gauge is such that it may be used lying flat upon the work table without interference from the scales 52 and 58, the clamping nut 36, and the adjusting nut 37 which are all mounted within the lateral limits of the triangular base block 10 and the gauge block 14.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim as my invention:

1. A gauge comprising, in combination, a right triangular base member having gauging faces on its two sides and a slideway having a longitudinal recess with internal shoulders on its hypotenuse, a gauge block having a transverse opening slidably mounted on said slideway and provided with a plurality of gaging surfaces parallel to and spaced at different distances from one of the gauging faces of the base member and provided with a gauging surface parallel to and spaced at a distance from the said other gauging face of the base member, an inclined scale on the base member along the hypotenuse, a vernier on the gauge block and registering with the said inclined scale, clamping means slidably mounted in the longitudinal recess for engaging the internal shoulders, a hollow threaded element secure to the clamping means and extending through the gauge block and terminating in the transverse opening thereof, manually operated threaded means positioned in the transverse opening and engaging the threaded element for forcibly constraining the clamping means against the internal shoulders and resisting longitudinal movement of the gauge block along the slideway, spring means for resiliently urging the clamping means slightly against the internal shoulders to produce a slight resistance to longitudinal movement of the gauge block along the slideway, rack and pinion means for giving relative movement between the gauge block and the base member, said rack means being positioned in the longitudinal recess, a shaft for carrying the pinion means, said shaft extending through the hollow threadable element and terminating in the transverse opening of the gauge block, a manually operated adjusting knob positioned in the transverse opening and secured to the end of the shaft, and a spring surrounding the shaft and normally urging the shaft and pinion means out of engagement with the rack means but permitting engagement upon manual depression of the said spring, said manually operated threaded means and said manually operated adjusting knob being positioned within the limits of the gauge block.

2. A gauge comprising, in combination, a right triangular base member having gauging faces on its two sides and a slideway having a longitudinal recess with internal shoulders on its hypotenuse, a gauge block having a transverse opening slidably mounted on said slideway, an inclined scale on the base member along the hypotenuse, a vernier on the gauge block and registering with the said inclined scale, clamping means slidably mounted in the longitudinal recess for engaging the internal shoulders, a hollow threaded element secure to the clamping means and extending through the gauge block and terminating in the transverse opening thereof, manually operated threaded means positioned in the transverse opening and engaging the threaded element for forcibly constraining the clamping means against the internal shoulders and resisting longitudinal movement of the gauge block along the slideway, spring means for resiliently urging the clamping means slightly against the internal shoulders to produce a slight resistance to longitudinal movement of the gauge block along the slideway, rack and pinion means for giving relative movement between the gauge block and the base member, said rack means being positioned in the longitudinal recess, a shaft for carrying the pinion means, said shaft extending through the hollow threaded element and terminating in the transverse opening of the gauge block, a manually operated adjusting knob positioned in the transverse opening and secured to the end of the shaft, and a spring surrounding the shaft and normally urging the shaft and pinion means out of engagement with the rack means but permitting engagement upon manual depression of the said spring, said manually operated threaded means and said manually operated adjusting knob being positioned within the limits of the gauge block.

3. A gauge comprising, in combination, a right triangular base member having gauging faces on its two sides and a slideway having a longitudinal recess with internal shoulders on its hypotenuse, a gauge block having a transverse opening slidably mounted on said slideway, an inclined scale on the base member along the hypotenuse, a vernier on the gauge block and registering with the said inclined scale, clamping means slidably mounted in the longitudinal recess for engaging the internal shoulders, a hollow threaded element secure to the clamping means and extending through the gauge block and terminating in the transverse opening thereof, manually operated threaded means positioned in the transverse opening and engaging the threaded element for forcibly constraining the clamping means against the internal shoulders and resisting longitudinal movement of the gauge block along the slideway, spring means for resiliently urging the clamping means slightly against the internal shoulders to produce a slight resistance to longitudinal movement of the gauge block along the slideway, rack and pinion means for giving relative movement between the gauge block and the base member, said rack means being positioned in the longitudinal recess, a shaft for carrying the pinion means, said shaft extending through the hollow threaded element and terminating in the transverse opening of the gauge block, a manually operated adjusting knob positioned in the transverse opening and secured to the end of the shaft, and a spring surrounding the shaft and normally urging the shaft and pinion means out of engagement with the rack means but permitting engagement upon manual depression of the said spring.

4. A gauge comprising, in combination, a right triangular base member having gauging faces on its two sides and a slideway having a longitudinal recess with internal shoulders on its hypotenuse, a gauge block having a transverse opening slidably mounted on said slideway, an inclined scale on the base member along the hypotenuse, a vernier on the gauge block and registering with the said inclined scale, clamping means slidably mounted in the longitudinal recess for engaging the internal shoulders, a hollow threaded element secure to the clamping means and extending through the gauge block and terminating in the transverse opening thereof, manually operated threaded means positioned in the transverse opening and engaging threaded element for forcibly constraining the clamping means against the internal shoulders and resisting longitudinal movement of the gauge block along the slideway, rack and pinion means for giving relative movement between the gauge block and the base member, said rack means being positioned in the longitudinal recess, a shaft for carrying the pinion means, said shaft extending through the hollow threaded element and terminating in the transverse opening of the gauge block, and a manually operated adjusting knob positioned in the transverse opening and secured to the end of the shaft.

5. A gauge comprising, in combination, a right triangular base member having gauging faces on its two sides and a slideway having a longitudinal recess with internal shoulders on its hypotenuse, a gauge block having a transverse opening slidably mounted on said slideway, an inclined scale on the base member along the hypotenuse, a vernier on the gauge block and registering with the said inclined scale, clamping means slidably mounted in the longitudinal recess for engaging the internal shoulders, manually operated means positioned in the transverse opening for constraining the clamping means against the internal shoulders and resisting longitudinal movement of the gauge block along the slideway, rack means carried by the base member and pinion means carried by the gauge block for giving relative movement between the gauge block and the base member, means for normally urging the pinion means out of engagement with the rack means, and a manually operated adjusting knob positioned in the transverse opening and arranged to actuate the pinion in engagement with the rack means for giving relative movement between the gauge block and the base member.

6. A gauge comprising, in combination, a right triangular base member having gauging faces on its two sides and a slideway having a longitudinal recess with internal shoulders on its hypotenuse, a gauge block having a transverse opening slidably mounted on said slideway, an inclined scale on the base member along the hypotenuse, a vernier on the gauge block and registering with the said inclined scale, clamping means slidably mounted in the longitudinal recess for engaging the internal shoulders, manually operated means positioned in the transverse opening for constraining the clamping means against the internal shoulders and resisting longitudinal movement of the gauge block along the slideway, rack means carried by the base member and pinion means carried by the gauge block for giving relative movement between the gauge block and the base member, and a manually operated adjusting knob positioned in the transverse opening and arranged to actuate the pinion in engagement with the rack means for giving relative movement between the gauge block and the base member.

7. A gauge comprising, in combination, a right triangular base member having gauging faces on its two sides and a slideway on its hypotenuse, a gauge block having a transverse opening slidably mounted on said slideway, an inclined scale on the base member along the hypotenuse, a vernier on the gauge block and registering with the said inclined scale, clamping means carried by the gauge block and engaging the base member for resisting longitudinal movement of the gauge block along the slideway, manually operated means positioned in the transverse opening for operating the clamping means and resisting longitudinal movement of the gauge block along the slideway, rack means carried by the base member and pinion means carried by the gauge block for giving relative movement between the gauge block and the base member, and a manually operated adjusting knob positioned in the transverse opening and arranged to actuate the pinion in engagement with the rack means for giving relative movement between the gauge block and the base member.

8. A gauge comprising, in combination, a right triangular base member having gauging faces on its two sides and a slideway on its hypotenuse, a gauge block having a transverse opening slidably mounted on said slideway, an inclined scale on the base member along the hypotenuse, a vernier on the gauge block and registering with the said inclined scale, clamping means carried by the gauge block and engaging the base member for resisting longitudinal movement of the gauge block along the slideway, manually operated means positioned in the transverse opening for operating the clamping means and resisting longitudinal movement of the gauge block along the slideway, rack means carried by the base member and pinion means carried by the gauge block for giving relative movement between the gauge block and the base member, and a manually operated adjusting knob positioned in the transverse opening and arranged to actuate the pinion in engagement with the rack means for giving relative movement between the gauge block and the base member, said manually operated means and said manually operated adjusting knob being positioned within the limits of the gauge block.

9. A gauge comprising, in combination, a right triangular base member having gauging faces on its two sides and a slideway on its hypotenuse, a gauge block slidably mounted on said slideway, an inclined scale on the base member along the hypotenuse, a vernier on the gauge block and registering with the said inclined scale, clamping means carried by the gauge block and engaging the base member for resisting longitudinal movement of the gauge block along the slideway, manually operated means for operating the clamping means and resisting longitudinal movement of the gauge block along the slideway, rack means carried by the base member and pinion means carried by the gauge block for giving relative movement between the gauge block and the base member, and a manually operated adjusting knob arranged to actuate the pinion in engagement with the rack means for giving relative movement between the gauge block and the base member.

10. A gauge comprising, in combination, a right triangular base member having gauging faces on its two sides and a slideway on its hypotenuse, a gauge block having a transverse opening slidably mounted on said slideway, an inclined scale on the base member along the hypotenuse, a vernier on the gauge block and registering with the said inclined scale, clamping means on the gauge block and engaging the base member for resisting longitudinal movement of the gauge block along the slideway, manually operated means positioned in the transverse opening for operating the clamping means and resisting longitudinal movement of the gauge block along the slideway, manually operable mechanism on the gauge block and the base member for giving relatively fine adjustment movements between the gauge block and the base member, said manually operable mechanism including a manually operated adjusting knob positioned in the transverse opening, said manually operated means and said manually operated adjusting knob being positioned within the limits of the gauge block.

11. A gauge comprising, in combination, a right triangular base member having gauging faces on its two sides and a slideway on its hypotenuse, a gauge block slidably mounted on said slideway, an inclined scale on the base member along the hypotenuse, a vernier on the gauge block and registering with the said inclined scale, clamping means including a hollow element on the gauge block and engaging the base member for resisting longitudinal movement of the gauge block along the slideway, manually operated means for operating the clamping means and resisting longitudinal movement of the gauge block along the slideway, manually operable mechanism carried by the gauge block and having an operating member extending through the said hollow element for engaging the base member for giving relatively fine adjustment movements between the gauge block and the base member.

12. A gauge comprising, in combination, a right triangular base member having gauging faces on its two sides and a slideway on its hypotenuse, a gauge block slidably mounted on said slideway, an inclined scale on the base member along the hypotenuse, a vernier on the gauge block and registering with the said inclined scale, clamping means on the gauge block and engaging the base member for resisting longitudinal movement of the gauge block along the slideway, manually operated means for operating the clamping means and resisting longitudinal movement of the gauge block along the slideway, manually operable mechanism having an adjusting knob carried by the clamping means and having an operating member engageable with the base member for giving relatively fine adjustment movements between the gauge block and the base member.

13. A gauge comprising, in combination, a right triangular base member having gauging faces on its two sides and a slideway on its hypotenuse, a gauge block slidably mounted on said slideway, an inclined scale on the base member along the hypotenuse, a vernier on the gauge block and registering with the said inclined scale, clamping means on the gauge block and engaging the base member for resisting longitudinal movement of the gauge block along the slideway, manually operated means for operating the clamping means and resisting longitudinal movement of the gauge block along the slideway, manually operable mechanism engaging the gauge block and the base member for giving relatively fine adjustment movements between the gauge block and the base member, said manually operable mechanism having an adjusting knob and an operating member connected to the gauge block, said adjusting knob being movable along the slideway with the gauge block as the gauge block and the clamping means move relative to the base member, said operating member being actuated by the adjusting knob and transmitting motion between the gauge block and the base member.

JULIUS FICHTER.